F. W. WOLF, Jr. & H. H. SOUTHWORTH.
REFRIGERATING APPARATUS.
APPLICATION FILED JAN. 29, 1912.

1,076,537.

Patented Oct. 21, 1913.

Witnesses:
T. A. Alfred
H. R. Wilkins

Inventors
Fred W. Wolf Jr.
Harrison H. Southworth
by Poole & Brown Attys.

F. W. WOLF, Jr. & H. H. SOUTHWORTH.
REFRIGERATING APPARATUS.
APPLICATION FILED JAN. 29, 1912.

1,076,537.

Patented Oct. 21, 1913.
7 SHEETS—SHEET 2.

Witnesses:

Inventors:
Fred W. Wolf, Jr.
Harrison H. Southworth
by Poole & Brown, Attys.

F. W. WOLF, Jr. & H. H. SOUTHWORTH.
REFRIGERATING APPARATUS.
APPLICATION FILED JAN. 29, 1912.

1,076,537.

Patented Oct. 21, 1913.

F. W. WOLF, Jr. & H. H. SOUTHWORTH.
REFRIGERATING APPARATUS.
APPLICATION FILED JAN. 29, 1912.

1,076,537.

Patented Oct. 21, 1913.

UNITED STATES PATENT OFFICE.

FRED W. WOLF, JR., AND HARRISON H. SOUTHWORTH, OF CLEVELAND, OHIO, ASSIGNORS, BY MESNE ASSIGNMENTS, TO CLARENCE E. MEHLHOPE, OF CHICAGO, ILLINOIS.

REFRIGERATING APPARATUS.

1,076,537.  Specification of Letters Patent.  Patented Oct. 21, 1913.

Application filed January 29, 1912. Serial No. 673,872.

*To all whom it may concern:*

Be it known that we, FRED W. WOLF, Jr., and HARRISON H. SOUTHWORTH, citizens of the United States, and residents of Cleveland, in the county of Cuyahoga and State of Ohio, have invented certain new and useful Improvements in Refrigerating Apparatus; and we do hereby declare that the following is a full, clear, and exact description thereof, reference being had to the accompanying drawings, and to the letters of reference marked thereon, which form a part of this specification.

This invention relates to improvements in automatic refrigerating apparatus of the absorption type and consists of the matters hereinafter described and more particularly pointed out in the appended claims.

The apparatus is of the general type described in an application heretofore filed by us on the first of March, 1911, bearing Serial Number 611,560, and is of the absorption type.

In the drawings, Fig. 18 is a detail view on an enlarged scale representing one of the check valves in vertical section, the plane of the section being indicated by the line 18—18 of Fig. 3.

Referring now to that embodiment of our invention illustrated in the drawings, 20 indicates an open tank which constitutes a supporting base for the apparatus and which is adapted to contain cooling water for the liquid ammonia condensing receiver which is located within said tank. The tank 20, as shown, is oblong and is deep in comparison to its length. It has a bottom wall, $20^a$, and a vertical wall, $20^b$. At the top of said vertical wall, is provided a flange, $20^c$, which, in the present instance, is formed by means of an angle iron extending about and secured to the vertical wall, $20^b$, at its upper edge.

21, 22 indicate parallel, longitudinally extending closed metal drums, each constituting a generator-absorber and being constructed to contain aqua-ammonia. Said drums extend parallel to and at each side of the longitudinal central axis of the tank, 20, and are located entirely within a vertical projection of said tank. They are supported above said tank in any convenient manner, and as shown in the drawings each rests in longitudinally spaced saddles 23, 23 carried at the upper ends of upright bars 24, 24 that bear upon and are rigidly secured to transversely extending angle bars 25, 25 bolted to the flange, $20^c$, at the upper edge of the tank, 20. Longitudinally spaced brackets 26, 26 located between and secured at their ends to the drums 21, 22, serve to hold the drums in spaced relation and to brace the supporting structure.

To the top of each drum 21, 22 is secured an open top, water tight box or tank 27, 28, respectively, said boxes or tanks extending substantially the entire length of said drums. Said tanks are adapted for containing cooling water for a purpose presently to be described and their bottom walls are preferably provided by the top wall of the associated drum so that the effect of the cooling water may be the more easily transmitted to the interior of said drum, adjacent to its top wall.

Figure 5:
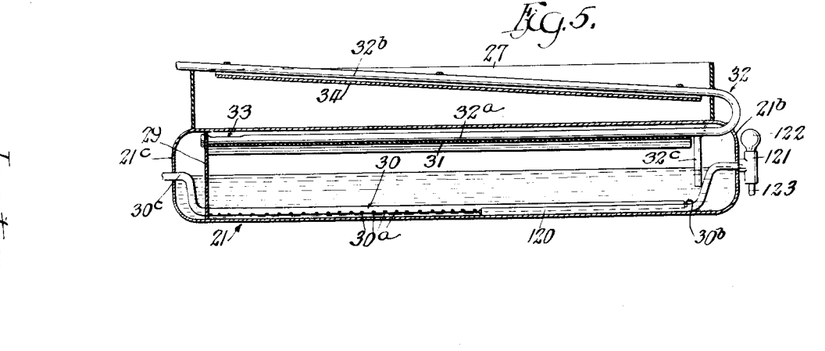
Fig. 5 is a view representing a longitudinal central section through one of the generator-absorber drums.

The interior construction and arrangement of the two generator absorbers are identical so that a description of one will suffice, the same letters of reference being applied in the drawings to like parts of each. Within each drum near its forward end is secured a baffle supporting plate 29. (See Fig. 5.) In the bottom of each drum is located an absorption pipe 30 which extends substantially the length of the drum. Said pipe has a line of perforations $30^a$ near its lower side and is closed at its rear end $30^b$. Its forward end $30^c$ is bent upwardly and forwardly and extends through an aperture in the baffle plate 29 and through an aperture in the front end wall $21^c$ of the drum and is rigidly secured within the latter in such manner as to form a gas tight joint. The pipe 30 constitutes the means for discharging ammonia gas into the aqua ammonia contained in the generator-absorber when the same is acting as an absorber to take up the ammonia gas which has expanded through the refrigerator coils. By reason of the location of said perforated pipe 30 at the bottom of the liquor contained in the generator-absorber the ammonia gas is caused to pass through the body of the liquor and is thus easily and rapidly absorbed up to the point of saturation. By placing the perforations in a line at or near the bottom side of the pipe, the ammonia gas is directed downward in the first instance so as to produce a swirl, which aids in the absorption of the gas by the liquor in the absorber.

In the top of the drum, a slight distance below the top wall of the same, is located a substantially horizontal longitudinally extending hood or shield 31, which has its lateral margins bearing against the inner surface of the wall of the drum and which extends from the baffle plate 29 near the front end of the drum to a point spaced from, but near the rear end wall $21^b$ thereof. Said hood or shield is slightly depressed adjacent a longitudinal median line to receive a horizontal leg $32^a$ of a bent pipe 32, the other leg $32^b$ of which is located outside of and above the drum and is inclined upwardly toward the front end of the drum. The shield is secured to and supported by said horizontal leg. Said pipe extends at the bend, thereof through an aperture in the rear end wall $21^b$ of the drum in which it is secured by a gas tight joint. The forward end of the horizontal leg $32^a$ of said pipe is closed and is rigidly secured to the baffle plate 29. At the forward end of said leg is provided an opening 33 in the top of the pipe. At the rear end of the shield or hood 31 and short of the bend in the bent pipe 32 is located a short vertical pipe $32^c$ which opens into the horizontal leg $32^a$ of said pipe 32. To the bottom side of the inclined leg $32^b$ of said pipe 32 is secured a transversely rounded, longitudinally extending plate 34 which provides a trough adapted to initially receive the cooling water, delivered to the tank or box 27 on top of the drum in a manner presently to be described, and cause it to run downwardly in contact with said pipe leg $32^b$.

The pipe 32 with its two legs $32^a$ and $32^b$ constitutes and will be hereinafter referred to as a rectifier, its operation being as follows: When the drum is being heated and is acting as a generator, the ammonia gas driven off from the strong liquor contained within the drum rises above the surface of the liquor and the larger part of it which rises at the rear of the baffle plate 29, coming in contact with the lower surface of the hood or shield 31, is directed thereby toward the rear end of the drum. There, rising above the said shield or hood, it is directed toward the forward end of the drum and finally, after passing through the space or chamber confined between the said hood or shield and the top wall of the drum, the ammonia gas enters the opening 33 at the forward end of the horizontal leg $32^a$ of the rectifier pipe and then passes entirely through said rectifier pipe 32. Such ammonia gas as is driven off forward of the baffle plate 29, also passes into the opening 33 of the rectifier pipe. As will presently appear, during the time the drum is acting as a generator, cooling water is being supplied to the tank or box 27 above it, said cooling water as has been said, being initially directed into the trough 34 secured to the inclined leg $32^b$ of the rectifier pipe. This cooling water cools the top wall of the drum and also the space or chamber confined between said wall and the hood 31, which, therefore, constitutes a rectifying chamber. As the ammonia gas passes through this chamber, the water vapor carried with it is condensed on the inner surface of the drum and thence falls to the shield or hood 21, from which it flows back into the bottom of the drum. Such water vapor as is still carried by the ammonia gas is further condensed as it passes through the horizontal leg $32^a$ of the condenser pipe and finally in the inclined leg $32^b$ thereof. The latter leg being the coolest by reason of its contact with the cooling water when it is coldest, acts to condense the last bit of vapor carried by the ammonia gas so that the ammonia gas delivered from the rectifier pipe 32 is practically dry and anhydrous. The water of condensation formed in the rectifier pipe flows back into the drum through the pipe 32$^c$ which is carried below the lowest level that may be reached by the liquor in the drum when it has reached the intended stage of weakness so that the ammonia gas may not enter the rectifier pipe through said pipe 32$^c$. From the generator-absorber drums the ammonia gas is driven to the ammonia condensing and liquid receiver coils. 37 indicates such coils which as illustrated herein, are located within the main tank 20 and rest upon blocks supported on the bottom 20$^a$ thereof. An upright pipe 38 at its lower end leads to the upper end of the liquid receiver coil 37 and said pipe connects at its upper end with pipes 39 and 40 which are each connected to an inclined leg 32$^b$ of the rectifier pipes 32 of the generator-absorbers 21, 22, respectively. Check valves are interposed in each of the connections between said pipes which will permit the flow of ammonia gas toward the liquid receiver coils 37 but which will prevent a backflow therefrom. As shown herein and to provide against possible leakage two check valves are interposed in the connection between each pipe 39, 40, leading from the generator-absorbers and the pipe 38 leading to the liquid ammonia receiver. Referring first to the pipe 39, said pipe is connected with an upright pipe fitting 41, (see Fig. 15) provided with an inwardly extending inclined radial flange 41$^a$ constructed to form an annular knife edge valve seat 41$^b$ upon which seats a ball valve 42. Gravity normally retains said valve upon its seat to prevent a back flow of ammonia gas into the pipe 39, but the outward flow of ammonia gas from said pipe 39 is readily permitted. The upper end of said pipe fitting 41 as shown in the drawings, is closed by a threaded plug 43 which has a reduced stem 44 that projects through a stuffing box 45 closing the outer end of said pipe fitting and has a squared end 44$^a$ so that the plug 43 may be screwed down to rigidly hold said ball valve 42 against its seat in case such closure, as when charging or cleaning the apparatus, becomes desirable or necessary. The upper end of the fitting 41 is externally threaded to receive a cap 46 which incloses the stem 44, and is preferably made gas tight to prevent leakage through the stuffing box. The pipe fitting 41 is connected to a second check valve structure 47 by means of a connection 48$^x$ which opens into said pipe fitting 41 above the valve seat 41$^b$. Said second check valve as shown in the drawings comprises upper and lower chambered members 47$^a$, 47$^b$, having flanges 47$^c$, 47$^d$ which are bolted together and separated by a diaphragm 48 of thin sheet metal, the marginal part of which is clamped between said flanges of the chambered members. The diaphragm 48 has a central aperture in which is secured an apertured valve plug 49, the upper end of which is formed to provide a knife edge valve seat 49$^a$ for a ball valve 50. Said valve plug as shown has a radially extending flange 49$^b$ which together with a nut 49$^c$ coacts to rigidly secure said valve plug to the diaphragm. The ball valve 50 is located in a recess 51$^a$ in the lower end of a plug 51 which is secured in a threaded aperture in the upper chambered member 47$^a$. Said recess 51$^a$ is larger than the diameter of the ball valve 50 which is adapted to roll against the end wall of said recess. The ball is embraced by a washer 52 which retains it in the recess 51 and which is held in sliding relation between the end of the said plug 51 and an inwardly extending radial flange 53$^a$ on a nut 53 threaded on said plug. The connection 48$^x$ which connects the fitting containing the check valve 42 with the check valve structure 47 opens into the upper chambered member 47$^a$ above the diaphragm 48.

The pipe 40 leading from the generator-absorber 22 is connected with a check valve structure similar to those described which are marked in the drawings with like reference numerals.

The lower chambered members 47$^b$ of the two check valve structures 47 associated with the two generator-absorbers are connected together by a pipe connection 55 which opens into each valve structure below its diaphragm 48, and the valve structure 47 nearer the pipe 38 leading to the liquid receiver is connected with said pipe by a connection 55$^a$ which likewise opens into the valve structure with which it is connected below the diaphragm 48. Thus gas which enters the lower chambered member 47$^b$ of either check valve structure may freely pass to the pipe 38 and thence to the liquid receiver coils but any pressure tending to force the ammonia gas backwardly toward the generator-absorbers through either of the apertured valve plugs 49 will act on the diaphragm 48 so as to cause the valve seats 49$^a$, at the upper ends of the said plugs to seat against the respective associated ball valve, the floating relation in which said balls are held permitting them to readily find their seats. On the other hand the normal tendency of the ammonia gas passing from one or the other of the generator-absorbers and tending to pass through one of the apertured valve plugs 49 acts to depress the associated diaphragm 48 so as to remove said plug from the ball and thus provide a free passage for the ammonia gas in a direction toward the liquid ammonia receiver coils.

As it is very difficult to provide check valves that are incapable of a slight leakage we provide the double system of check valves for each generator-absorber as above described and in addition intermediate said check valves in each case provide the following mechanism: 60 indicates an upright pipe which, as shown in the drawings, has its upper end secured to and opening laterally into the pipe fitting 41 above the valve seat 41$^b$. 61 indicates a casting having a passage 62 with an upright branch 62$^a$ opening through the upper end of said block and into which the lower end of the pipe 60 is threaded; a horizontal branch 62$^b$; and a second upright branch 62$^c$ spaced from the first. A valve seat 62$^d$ is formed at the upper end of said branch 62$^c$ to receive a ball valve 63, which normally closes said branch. Said ball valve is located in a chamber 63$^a$ which is connected by a pipe 65 with the absorption pipe 30 located in the bottom of the associated generator-absorber. Thus any ammonia gas which by reason of head pressure from the liquid ammonia receiver coils or from any other source leaks through the check valve structure 47 and passes in the contrary direction therethrough, will take the path of least resistance down through the pipe 60, and through the passage 62 in the block 61, and lifting the light ball valve 63 will pass through the connection 65 into the absorption pipe 30 of the associated drum whence it will escape below the surface of the aqua ammonia therein by which it will be absorbed.

The connections by which the ammonia gas after it has expanded through the refrigerating coils is conducted to one of the absorption pipes 30 located in one or the other of the generator-absorbers by the liquor contained therein in which it is reabsorbed, are as follows: At the rear end of the apparatus is located a scale trap 65$^x$ consisting, as shown, of a casting containing a chamber 65$^a$ (see Fig. 17) in which is centrally located a tube 66 of wire gauze or other suitable material. Said gauze tube is secured at its lower end to an upright boss 67$^a$ on a plug 67 which closes the lower end of the chamber 65$^a$. The upper end of said gauze tube is secured to the upper wall of the chamber in line with a passage 68 which opens thereinto and which is connected with a fitting 69 containing a valve to be referred to later and connected with a pipe 70 which leads from the refrigerating coil. It is apparent that the ammonia gas entering the chamber 65$^a$ in the casting 65 must pass through the gauze tube 66 which will retain any scale that would otherwise be carried into the apparatus from the refrigerating coil, and tend to interfere with the operation of the check valves.

A pipe 71 leads from the chamber 65$^a$ and is connected by a T-fitting 72 to pipes 73, 74—one for each generator absorber. Said pipes are respectively connected by traps, 75, 75 extending under the respective generator absorbers with upright pipes 76, 77 each of which lead by connections, presently to be described, to the absorption pipe 30 in an associated generator absorber. The traps 75 each consists of a pipe or tube having closed or plugged ends 75$^c$, 75$^d$. Said pipe or tube is inclined upwardly from front to rear of the apparatus and the pipes 76 and 77 each open into its associated trap through its forward plugged end 75$^c$ below the longitudinal central axis of the trap while the pipes 73, 74 each open into the rear plugged end 75$^d$ of its associated trap above said longitudinal central axis. The purpose of said traps will presently appear.

The upper ends of the pipes 76 and 77 are connected with their associated absorption pipes 30 by devices which are similar so that a description of one will suffice for both, like parts being indicated by the same numerals.

80, (see Fig. 15) indicates a check valve structure identical with the check valve structure 47 heretofore described except that it is in reversed position with the chambered member 47$^a$ below instead of above and the ball valve 50 below the diaphragm instead of above as before. The various parts of the structure are lettered as in the other case. The pipe 76 is connected to and opens into the chambered member 47$^a$ below the diaphragm.

81 indicates an upright pipe-fitting connected to and opening into the chambered member 47$^b$, said fitting being of the same construction as the fitting 41 heretofore described and shown above it in Fig. 15 and containing a ball check valve 81$^a$ adapted to permit the upward passage of gas but to prevent a back flow through the fitting 81 toward the associated trap 75. In the casting 61, which has the valve chamber 63$^a$, connected with the absorption pipe 30 as heretofore described, is formed a passage 64 that connects said valve chamber with a pipe 83 leading into the fitting 81 above the seat of the ball valve 81$^a$.

The operation of these several devices last described is as follows: When one of the generator absorbers is acting as an absorber, say the generator absorber 21, the other, 22 in the meantime, acting as a generator, the ammonia gas from the refrigerating coil, after passing the trap 75, passes through the pipe 71 to the T-fitting 72 whence it passes through the pipe 73, the associated trap 75 and the pipe 76, leading to the drum 21, since it has a free, unrestrained passage through said connection, (whereas a passage through the pipe 74, the associated trap 75 and the pipe 77 to the generator absorber 22 is resisted by the back pressure therefrom due to its action as a generator, which back pressure acts to hold the associated check valves 81ᵃ and the valve of the valve structure 80 closed against their seats.) The said pressure from the generating drum may cause some of the liquor to leak past the associated check valves 81ᵃ and valve structure 80, in which case the liquor will pass into the associated trap 75 wherein it will remain, until the generator absorber ceases to act as a generator and again acts as an absorber, whereupon the liquor which has collected in the trap will be forced back into the drum from which it came. By the use of this trap the liquor initially placed in each drum is retained therein and prevented from passing to the other drum so that the balance between the two drums is maintained. Since the traps 75 are of comparatively large diameter and are inclined and the pipes 73, 74 entering their rear ends are at their highest points, it is apparent that a large amount of liquor may be taken care of by said traps. In practice only a very small quantity of liquor, if any, will enter said traps when the apparatus is working normally. The traps 75 as shown in the drawings are suspended by U-bolts 75ᵃ, 75ᵇ rigidly secured to the front and rear transverse angle bars 25, 25 that are supported on the main tank 20.

We now pass to a description of the mechanism for alternately heating and cooling the drums 21, 22 causing them each to alternately act as a generator and then as an absorber. As shown herein we prefer to use gas for heating purposes and water for cooling purposes but manifestly our invention is not limited to or dependent upon such cooling and heating media. The important feature is a controlling mechanism to terminate the action of the generator when a predetermined temperature of the liquor contained therein has been reached and to continue the action of the absorber at least until a predetermined pressure in the strong liquor therein has been reached. The degree of saturation, or the amount of ammonia gas that a given amount of water will contain, other things being equal, are dependent upon temperature and pressure, the amount being in direct proportion to the pressure and in inverse proportion to the temperature. The predetermined temperature indicating that the liquor in the generator has been reduced to the intended weakness and the predetermined pressure indicating that the liquor in the absorber has reached the intended strength or degree of saturation may be attained simultaneously, but more often they are separated by a longer or shorter interval of time and the absorber will usually continue as such for some time after the generator has finished its work. Under some circumstances the predetermined pressure in the absorber may be reached and passed before the generator has reached the predetermined temperature. It is therefore necessary that the controlling device shall turn off the heat from the generator when the intended amount of gas has been driven from the liquor therein, but that it shall not apply the heat to the other generator absorber while it is being cooled but after it completes its cycle as an absorber when the heat should be applied to the drum which has been absorbing and the cooling means shifted from the drum which has been absorbing to the drum which has been generating.

Various means for actuating the controlling mechanism may be used, the factor which determines the time of such actuation being the temperature and pressure in the two generator absorbers respectively indicating the condition of the liquor therein as to weakness or strength. In that embodiment of our invention illustrated herein we make use of the temperature developed in the drums when acting as generators and the pressure developed therein when they are acting as absorbers, for developing the power necessary for actuating the controlling mechanism, but manifestly our invention is not limited to such motive power.

As shown in the drawings, a burner 90 is used for alternately heating the drums. Said burner is hinged to swing about a longitudinally extending, horizontal axis located below and in a vertical plane half way between the drums 21, 22 so that it may be brought alternately into a position to heat either of the drums. Said burner 90 consists of longitudinally extending parallel, vertically spaced pipes 91, 92 connected together at longitudinally spaced intervals by pipes 93. The upper pipe 91 is plugged at its ends and is perforated on its upper side and constitutes the burner proper. The lower pipe 92 forms a rock shaft on which the burner 90 swings as a whole. Said pipe 92 is rotatively mounted in bearing blocks 94, 95 secured to the transverse angle bars 25 supported on top of the main tank 20 and is held against longitudinal movement by means of collars 96 and 96ᵃ rigidly secured to it adjacent said bearing blocks. The rear end of the pipe 92 is plugged. At its forward end is secured a controlling valve 97 which controls the feed of fuel gas to the burner. Said valve 97 consists as shown herein of two hollow disks 98, 99 arranged in abutting relation and separated by a leather gasket 100 which provides a gas tight joint. The adjacent faces of the disks are preferably recessed to receive the gasket 100 which is rigidly secured by cement or otherwise to one of said disks, for example the disk 98; 98ᵃ indicates an annular chamber in the disk 98 and 99ª a chamber entirely filling the disk 99. The disk 99 is provided on the side adjacent the disk 98 with a centrally located tubular stem 101 which opens into the chamber 99ª in the disk 99. The disk 98 has a central aperture through which said stem projects so that the disk 98 is rotatively mounted on said stem.

102 indicates a spring washer in engagement with the outer face of the disk 98, and 103 indicates a nut threaded upon the stem 101, the two acting to hold the disk 98 with the leather gasket 100 in yielding engagement with the disk 99. In line with the tubular stem 101 and on the opposite face of the disk 99 is a second tubular stem 104 which also opens in to the chamber 99ª of said disk. The outer end of this second tubular stem is provided with a conical valve seat to receive a needle valve 105 which extends through both stems 101 and 104 and which has a threaded plug member 105ª which is threaded into the stem 101 and a squared head 105ᵇ which may be operated through the outer end of the stem 101 to adjust the needle valve. A cap 106 closes the outer end of the stem 101.

107 indicates a flared mouth piece rigidly secured to the open end of the pipe 92 of the burner. Said mouth piece is secured at its larger end to the disk 99 and contains centrally spaced within it a ring 107ª rigidly supported in axial alinement with the pipe 92 by radial ribs 107ᵇ. Said ring forms a bearing for the stem 104 on the rear face of the disk 99 which is rotatively supported within it. The mouth piece 107 has annularly spaced openings 107ᶜ for the entrance of air as in the case of a Bunsen burner.

Figures 6, 7, 8, 9, 10:
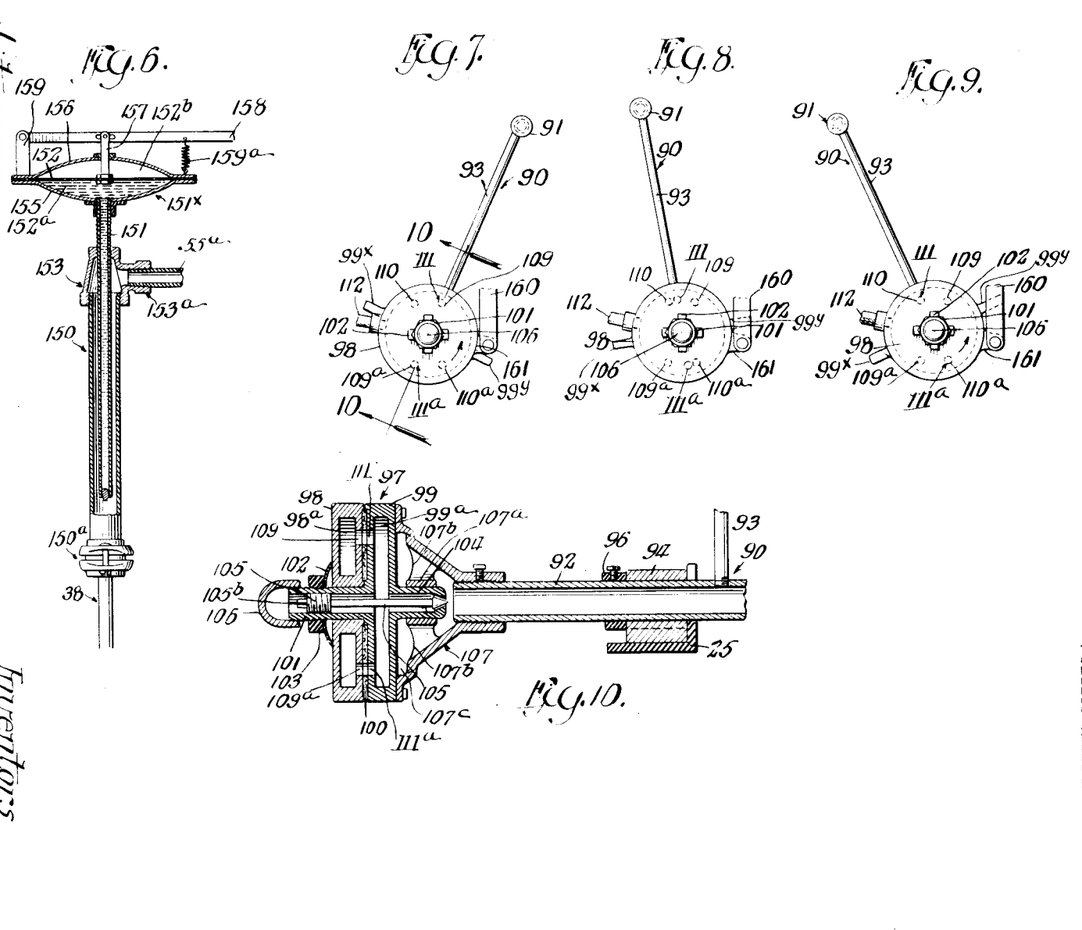
Fig. 6 is a view on an enlarged scale representing a partial, vertical section through the apparatus in a plane indicated by the line 6—6 of Fig. 2.
Figs. 7, 8 and 9 are views in end elevation representing the burner and valve controlling the supply of fuel gas thereto in different positions.
Fig. 10 is a view representing a section through the said controlling valve in a plane indicated by the line 10—10 of Fig. 7.

In the face of the disk 98 which is adjacent the disk 99, are provided a pair of diametrically opposite ports 109, 109ª and a second pair of diametrically opposite ports 110, 110ª spaced annularly from the first pair. The diameters of the said disk 98 in which said ports lie are normally located, as shown in the drawings, at equal angular distances at either side of a vertical line. Said ports of course extend through the leather gasket 100 and open into the annular chamber 98ª within said disk. The disk 99 is provided with a pair of diametrically opposite ports 111, 111ª which, as shown in the drawings, lie in that diameter of the disk which is in the plane of the burner 90. It will be apparent from an examination of Figs. 7 to 9 inclusive that when the burner is in one position, for example in heating position below the drum 21, as shown in Fig. 7, the ports 111, 111ª of the disk 99 will register respectively with the ports 109, 109ª of the disk 98 and that when the burner is in its opposite position under the drum 22, as shown in Fig. 9, the ports 111, 111ª of the disk 99 will register with the ports 110, 110ª of the disk 98. Thus in each of the said positions a free passage for the fuel gas is provided through the disks to the burner; but at any intermediate position of the burner as shown in Fig. 8, the ports 111, 111ª will be closed against the face of the intermediate leather gasket 100, thus cutting off the supply of gas to the burner. Gas is supplied to the chamber 98ª of the disk 98 by means of a flexible pipe 112 (see Fig. 3) which leads from a fuel gas supply pipe 113. 114 indicates an upright pipe leading from said supply pipe 113 to a horizontal pipe 115 below and at the forward ends of the drums 21, 22 and connected with pilot burners 116, 117 so located that they will light the burner 90 when it is at either limit of its movement under and in position to heat either of the generator absorbers.

The power mechanism for throwing the burner, as shown herein, is as follows: In each drum 21, 22 is located a pipe 120 preferably located at the bottom of the drum and extending a short way therethrough. Said pipe is closed at its end in the drum and is led out through an aperture in the rear end wall of the drum in which it is secured by means of a gas tight joint. The pipes 120 contain a fluid adapted to be readily affected by changes of temperature and in the present instance contains water. Said pipe 120 in each case is connected with a T-fitting 121 which is closed at its upper end by a hollow dome or ball 122, and at its lower end is connected to a pipe 123 which leads to a mechanical expansion device, in this case a metallic bellows 124 which is adapted to elongate and shorten in accordance with the pressure developed therein. When the water in the pipe 120 is heated, steam is generated, thus developing pressure in the pipe 123 and the bellows 124 which causes said bellows to expand. The bellows 124, 124 are supported on a horizontal bar 125 rigidly secured to the rear end of the tank 20. Each bellows is secured to and bears at its outer end against a fixed upright bar 126 rising from said horizontal bar 125. The inner end of the bellows is provided with a rigid horizontal stem 127 and with a fixed collar or cup 128 at the base of said stem which forms a seat for one end of a coiled spring 129 the other end of which seats in a second cap or cup 130 spaced from the first. Said cups 128 and 130 have bases respectively 128ª and 130ª which have sliding bearing on the horizontal bar 125.

At the end of the stem 127 is carried an anti-friction device, in this case a roller 127ª, adapted for engagement with a cam 131 on a vertically reciprocable rod 132 having bearing in an upright bracket 133 rising from and secured to the horizontal bar 125. The upward movement of said rod 132 is limited by a stop pin 132ª adapted to engage a fixed part of the bracket 133 and is normally held in its uppermost position by a coiled spring 134 which is interposed between the cam 131 and the bar 125.

135 indicates a bar at the rear end of the burner 90 rigidly connected at its ends respectively with the burner pipe 91 and with the rock shaft pipe 92. Said bar is provided intermediate, its ends with an arcuate detent member 135ª having opposite ends arranged to travel in a path into which the upper end of the vertically reciprocable rod 132 normally projects. When the burner is in position to heat the drum 21 for example, the detent member 135ª is engaged against the upper end of the bar 132 on the side adjacent said drum.

Figure 11:
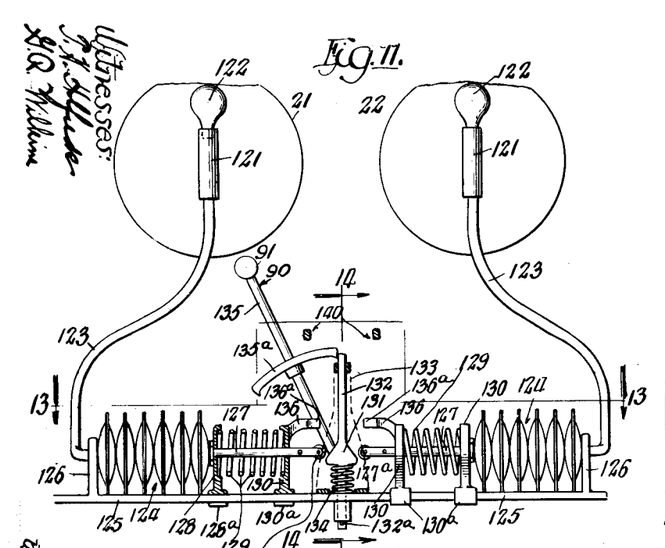
Fig. 11 is a view in end elevation representing the mechanism for actuating the said controlling valve.
Figure 12:
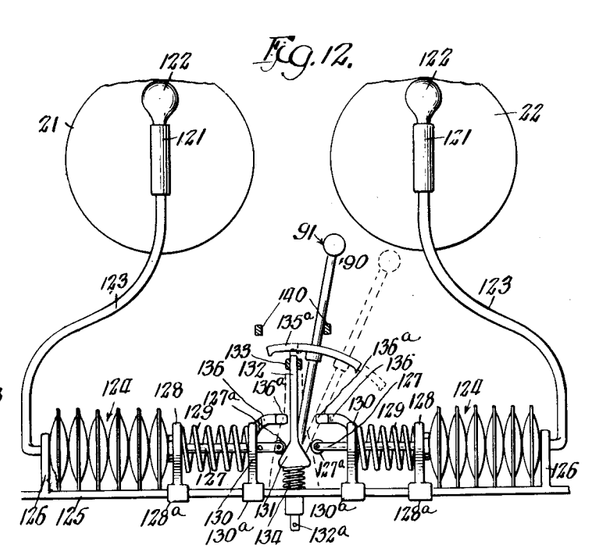
Fig. 12 is a like view showing the parts in a different position.
Figure 13:
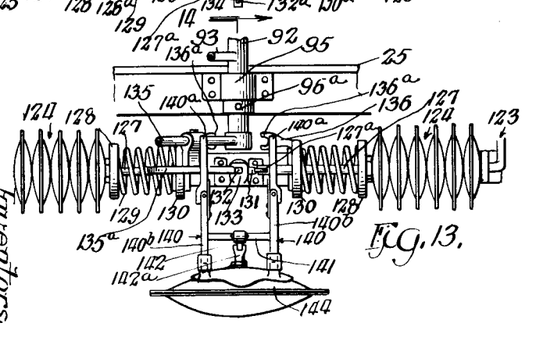
Fig. 13 is a view representing a horizontal section through the said mechanism with the parts in position as shown in Fig. 11, the plane of the section being indicated by the line 13—13 in Fig. 11.
Figure 14:
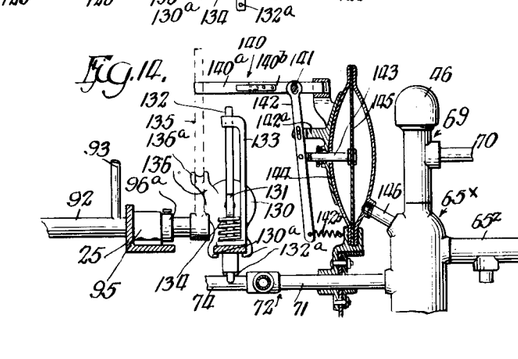
Fig. 14 is a view representing a vertical section through said mechanism in a plane indicated by the line 14—14 of Fig. 10.

The spring retaining cup 130 at the outer end of the spring 129 has an arm 136 with a forked end 136ª which is adapted for engagement with the bar 135. When the burner 90 is in heating position under the drum 21 for example (see Fig. 11) the forked end of the arm 136 of the associated spring retaining cap 130 engages the bar 135 at the rear of the burner and said bar is held against movement by reason of the engagement of its detent member 135ª with the vertically reciprocable spring controlled rod 132. As the burner heats the drum 21, the rise in temperature communicated to the liquor therein is imparted to the pipe 120 and to the water contained therein, so that steam pressure is developed in the pipe 123 and in the expansion bellows 124, causing said bellows to expand and move the stem 127 toward the right as shown in Fig. 11. As the cap 130 is held against movement by reason of the fact that its arm 136 is engaged against the bar 135 of the burner, which in turn rests against the end of the engagement of its member 135ª ear 135 against the upper end of the vertically reciprocable rod 132, the movement to the right of the spring retaining cap 128 under the expansive action of the bellows 124 presses the spring 129 between its two retaining caps. Energy is thus stored in the said spring 129 until during the last part of the expansive movement of the bellows 124 which is carefully predetermined to take place when the liquor in the drum 21, which is acting as a generator, has reached a predetermined temperature indicating that the liquor therein has reached its intended stage of weakness, the anti-friction roller 127ª, carried at the end of the stem 127 engages against the cam 131 and through it moves the rod 132 to reduce its upper end out of the road of the detent member 135ª carried by the rod 135 of the burner. This releases the cap 130 so that the stored energy of the spring 129 acts to throw the burner toward its other position under the drum 22, which, during this period has been acting as an absorber. The burner, however, does not necessarily at once reach the said position under the other drum by reason of mechanism now to be described, but does pass into a position beyond a neutral position such that its weight will, when the burner is released, cause it to automatically travel to said position under the drum.

At each side of a vertical plane half way between the generator absorbers and located in the path of movement of the burner rod 135 are located horizontally spaced reciprocable catches 140, 140 which project into the path of the burner bar 135. Said catches are each made in two parts 140ª, 140ᵇ so connected together that the parts 140ª may freely swing toward each other but are locked against movement in a direction away from each other. Said catches are pivotally connected to a horizontal bar 141 carried at the upper end of a lever 142 fulcrumed to a lug 142ª projecting from a diaphragm casing 144 and connected below said fulcrum to a stem 143 projecting from said casing and rigidly connected to a diaphragm 145 contained therein. The lower end of said lever 142 is connected by a spring 142ª to the casing 144 which spring normally holds said lever in such position that the catches 140, 140 actuated thereby project into the path of the burner rod 135. The diaphragm casing is connected by a fitting 146 with the chamber 65ª in the scale trap, which, as has been described, is connected with both of the generator absorbers and in which is contained ammonia gas at a pressure equal to the back pressure exerted by the generator absorber which is acting as an absorber. The tension of the spring 142ª is so adjusted that when the pressure in the scale trap has reached a certain point corresponding to a carefully predetermined back pressure in the generator absorber that is acting as an absorber, indicating a certain saturation of the liquor therein, the pressure against the diaphragm will cause its stem 143 to swing the lever 142 so as to withdraw the catches 140 out of the path of the burner bar 135. When the burner is shifted under the action of the bellows 124, as heretofore described, due to the heat generated in the drum which is acting as a generator, it first strikes the nearest catch 140 and, swinging the forward part 140ª of said catch out of the way, strikes the second catch which arrests it just after the burner has passed through a neutral position. Should the liquor in the drum which is absorbing have not yet reached the predetermined degree of saturation, the burner will stand in this position until such point of saturation has been reached when the pressure due to such saturation, acting upon the diaphragm in the casing 144, will act to withdraw said catch 140 from the path of the burner rod whereupon the burner will fall to its position below the drum which has been acting as an absorber. As has been said, the burner in the intermediate positions is turned off, being lighted only when in position below a generator absorber. But we prefer also to provide means for partially or completely turning off the burner before it has been shifted from beneath the generator absorber which it is heating, upon the occurrence of certain conditions now to be described.

As the ammonia gas driven off from the drum which is being heated and is acting as a generator passes through the associated rectifying pipe 32, it will, under usual conditions, become thoroughly dehydrated and anhydrous and will pass to the condensing and liquid receiver coil as dry ammonia gas. But it may sometimes happen, by reason of the fact that the cooling water supplied to cool the same condenser pipe is decreased in amount or becomes too warm to condense the water vapor carried over with the ammonia gas rapidly enough to completely dehydrate the ammonia gas generated or driven off at the rate of increase of temperature in the drum caused by the burner burning at its full power or by reason of a change of head or of heating power that all of the water vapor will not be condensed in the pipe 32. This will be indicated by the fact that the temperature of the ammonia gas delivered from the rectifier pipe is higher than a certain degree and accordingly we provide at a point intermediate the rectifier pipe and the ammonia condenser and receiver coils 37, a thermostatically controlled device which is so connected with the valve controlling the fuel gas supply that said valve may be operated to reduce or entirely cut off the supply of fuel gas should the ammonia gas delivered from the rectifier pipe rise to or above a certain point indicating that the ammonia gas has not been properly rectified.

Intermediate the pipe 38 which leads to the condenser receiver coils 37 and the connection 55ª which leads from the rectifying pipes 32 of both generator absorbers 21, 22, is located a pipe of large diameter 150 (see Figs. 3 and 6) which contains a tube 151 projecting without said pipe and connected at its outer end with a casing 151ˣ containing a diaphragm 152. As shown in the drawings, the pipe 150 is connected by a suitable coupling 150ª with the upper end of the pipe 38 and is provided at its upper end with a T-fitting 153 through which the tube 151 projects and which has a laterally directed nipple 153ª connected with the pipe 55ª. The connection is such that the ammonia gas passes about and in contact with the outer surface of the tube 151. The lower end of said tube 151 is closed while its upper end is secured to the casing 151ˣ. Said casing comprises flanged concave-convex shells 155, 156 which are bolted together, the marginal part of the diaphragm 152 being clamped between their flanges. Said diaphragm divides the casing into chambers 152ª 152ᵇ. The tube 151 and the lower chamber 152ª of the casing 151ˣ are filled with a fluid, preferably ether, adapted to be expanded by a change of temperature. A stem 157 is rigidly secured to the diaphragm 152 and projects through the shell 156 which serves to guide it in its operation.

158 indicates a lever fulcrumed at one end to a lug 159 rising from the casing 151ˣ and having pivotal connections with the stem 157. A coiled spring 159ª connected at one end to the lever 158 and at the other end to the casing 151ˣ tends to resist the upward movement of the lever under the action of the diaphragm due to the expansion of the fluid contained in the tube 151. The free end of the lever 158 is connected by a link 160 (see Fig. 3) with a radially extending lug 161 on the disk 98 of the fuel gas controlling valve. The spring 159ª is so adjusted that if the ammonia gas which passes through the pipe 150 in contact with the tube 151 rises to a certain predetermined temperature below the predetermined temperature at which the burner is shifted away from the drum that is being heated, the expansion of the fluid in said tube 151 will, through the diaphragm 152, raise the lever 158 and through the link 160 and rock arm 161 rotate the disk 98 in the direction of the arrow so as to partially or entirely cut off the supply of fuel gas to the burner. As soon as the temperature of the ammonia gas falls, the fluid in the tube 151 will contract and the lever drop, thus rotating the disk so as to reopen communication between the ports of the disks 98 and 99.

Figures 1, 1B:
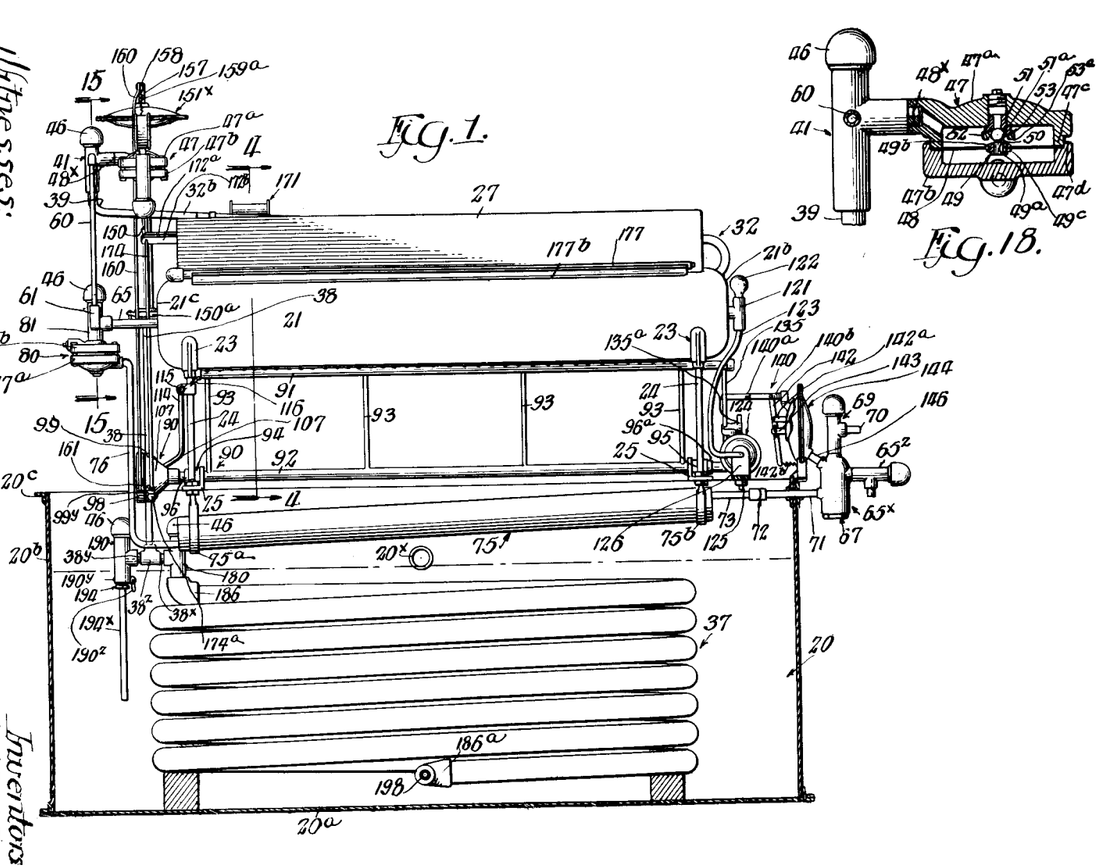
Figure 1 is a view representing our improved apparatus in side elevation.
Figure 2:
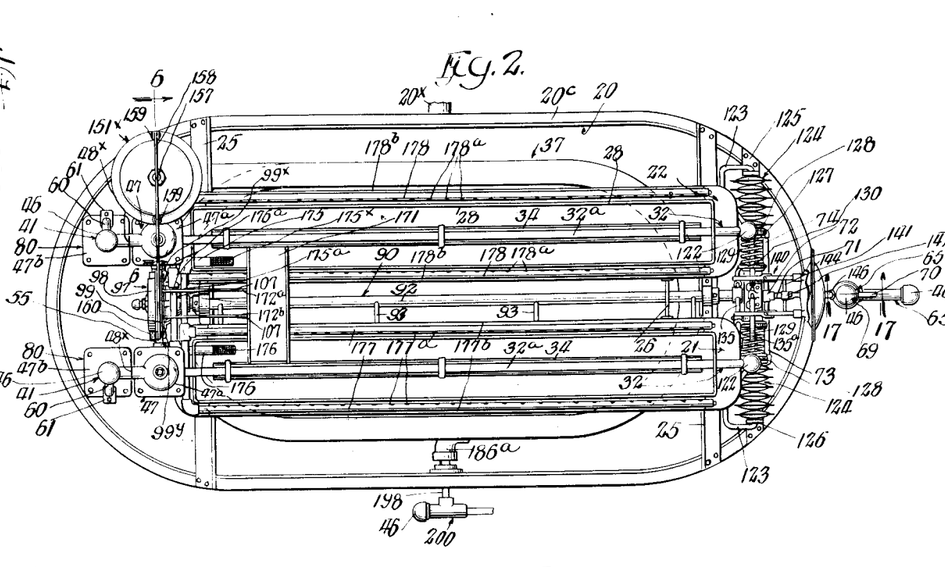
Fig. 2 is a top plan view of the same.
Figure 3:
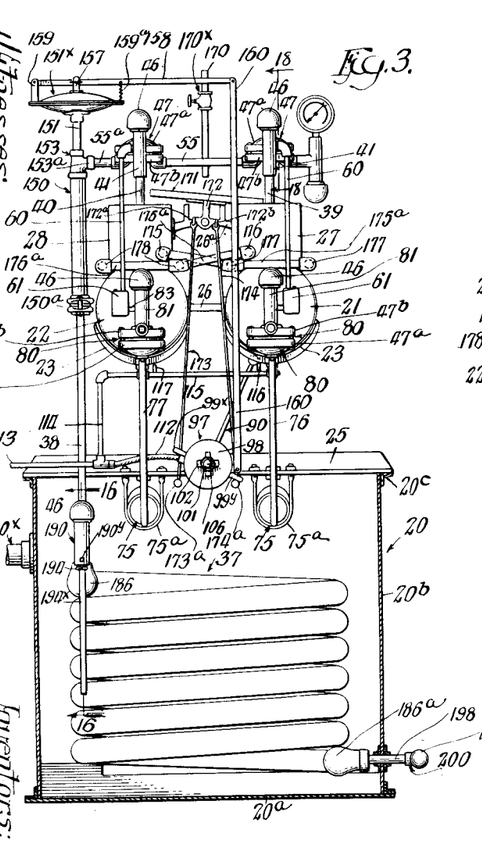
Fig. 3 is a view representing the apparatus in front elevation.
Figure 4:
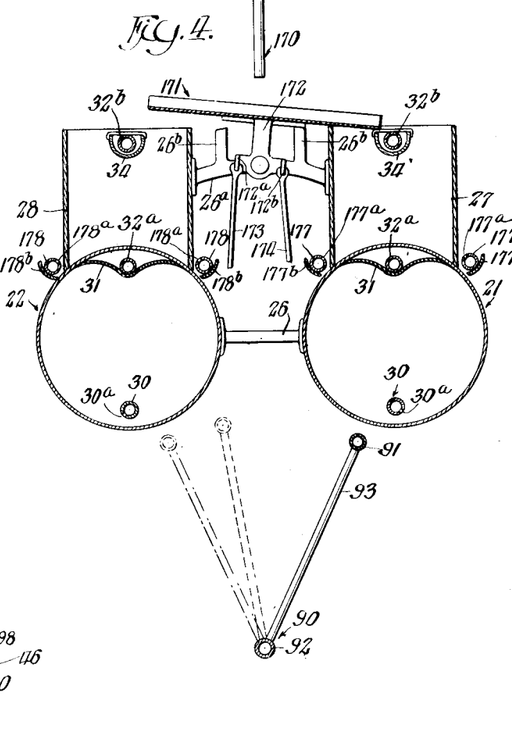
Fig. 4 is a view representing a partial section through the apparatus in a place indicated by the line 4—4 of Fig. 1.
Figure 20:
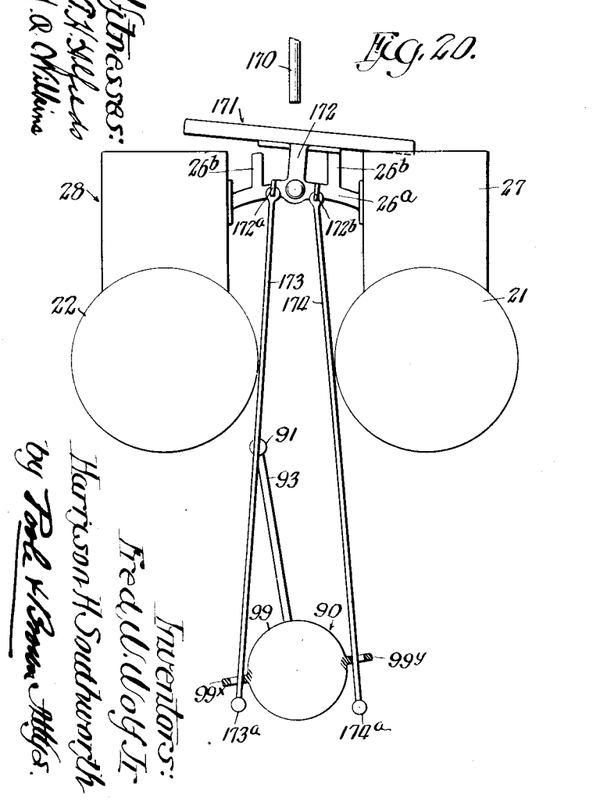
Figs. 20 and 21 are diagrammatic views representing the water cooling mechanism in different positions to be referred to later.
Figure 21:
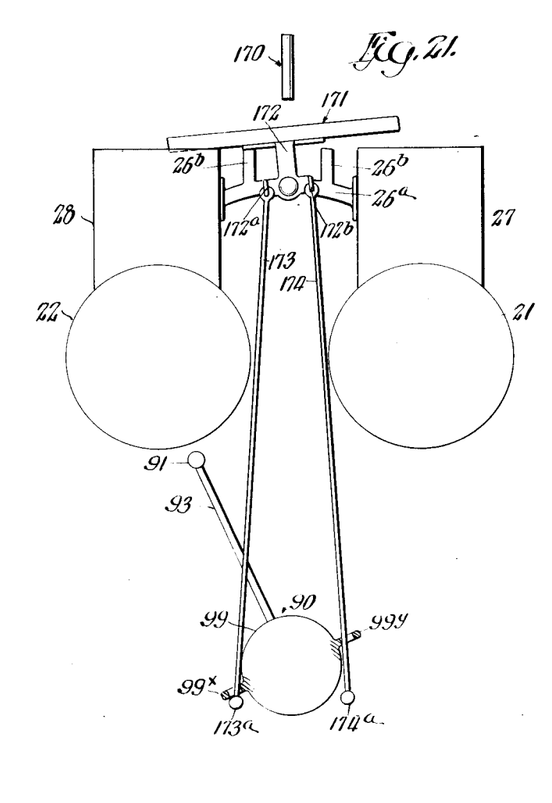

As shown in the drawings herein, water is used as the cooling medium for alternately cooling and heating the generator absorbers. The supply of cooling water is controlled as follows: 170 indicates a pipe or conduit connected with any suitable source of water supply and is provided with a hand valve 170ˣ. Said pipe is located above and substantially midway between the tanks or boxes 27, 28 which are located on the generator absorbers 21, 22 respectively. 171 indicates a trough carried at the upper end of a rocking support 172 which has pivotal connection with a bracket 26ª that braces the boxes apart and which has two upright lugs which act as stops or rests to engage the bottom of the trough 171 in either of its two positions, in one of which it directs water into the box 27 and in the other of which it directs water into the box 28. The rocking support 172 is provided with rock-arms 172ª 172ᵇ which project longitudinally forward into the plane of the fuel gas controlling valve 90. 173, 174 indicate depending links pivotally connected at their upper ends to the rock-arms 172ª, 172ᵇ respectively. The disk 99 has radially extending, slotted rock arms 99ˣ, 99ʸ through which extend the links 173, 174 respectively which are provided with lugs 173ª, 174ª at their lower ends that are adapted for engagement against the lower sides of said rock arms 99ˣ and 99ʸ. The operation of this mechanism is as follows: The trough 171 as shown in Figs. 3 and 4 stands in a position to direct the cooling water into the box on the drum that is being heated, that is to say, as shown in the said figures, into the box 27 on the drum 21. Said trough directs the water, as has been before stated, in the first instance into the trough 34 supported by the inclined leg 32ᵇ of the rectifier pipe 32, and from this it falls into the associated box on the generator absorber. In this position of the trough 171, the lug 174ª on the link 174 adjacent the box 27 is in contact with the rock arm 99ʸ of the valve disk 99 while the lug 173ª on the other link 173 is in a position spaced below the rock arm 99ˣ of said valve disk. When, upon the predetermined temperature being acquired by the drum 21, the valve disk 99 is rotated as hereinbefore described until the rod 135 on the burner strikes the catch 140 farthest removed from it and is arrested thereby, the rock arm 99ˣ is rotated toward the lug 173ª on the link 173, but its movement is arrested short of its striking said lug (see Fig. 20). When, under the action of the back pressure in the diaphragm casing 144, the catch 140 is withdrawn from the path of the rod 135, the weight of the burner causes it to rotate into heating position below the drum 22 and with it the valve disk 99 and its rock arm 99ˣ, and the rock arm 99ˣ in the last part of its movement strikes the lug 173ª on the link 173 and pulls down on said link so as to shift the rocking frame 172 into a position such that the trough carried thereby will direct the cooling water into the box 28 above the drum 22 as shown in Fig. 21. At the forward ends of the boxes 27, 28 near their bottoms are located outlet pipes 175, 176 respectively which are connected with longitudinally extending pipes 177, 177 and 178, 178 located at each side of the bottoms of the boxes 27, 28 respectively, the connecting pipes being indicated at 175ª, 176ª. The pipes 177 and 178 are provided with lines of perforations 177ª, 178ª adapted to direct the water against the respective drums, and troughs 177ᵇ and 178ᵇ are provided below said pipes to aid in properly directing the water flowing from said apertures so that it will flow downwardly in contact with said drums. From the surface of the drums it falls into the tank 20 wherein it acts to cool the condensing and liquid receiver coil 37.

Intermediate the liquid receiver coil 37 and the pipe 38 that conducts the ammonia gas from the generator absorbers is interposed a valve mechanism as follows: At the end of the pipe 38 is secured a T-fitting 38ᶻ, one end of which is connected by a pipe 38ˣ to an upright pipe fitting 180, and the other end of which is connected to an upright pipe fitting 190. The lower end of the pipe fitting 180 is connected by an elbow 186 to the inlet end of the liquid receiver and condensing coil 37. In the fitting 180 below the level of the connecting pipe 38ˣ is formed an annular radially extending flange 180ª, which is formed to provide a knife-edge valve seat 180ᵇ, on which is adapted to seat a ball valve 182. Said ball valve is carried at the lower end of a plug 181, threaded into the upper end of the T-fitting 180 and having a reduced stem 183, which projects through a stuffing box 185 that closes the upper end of the pipe fitting 180. Said reduced stem has squared head 184, by means of which the plug may be rotated to raise or lower its lower end. 46 indicates a cap which incloses the stuffing-box 185 and stem 183, said cap being threaded onto the upper end of the pipe fitting 180 in such manner as to form a gas-tight joint. The ball valve 182 is located in a recess 181ª in the lower end of the stem 181, which recess has a flat bottom wall against which the ball is adapted to roll, and side walls which are bent at their lower ends into such position as to prevent the ball from dropping out of the recess. By rotating the plug 181, the ball valve 182 may be caused to close against the seat 180ᵇ, (the rolling movement of the ball on the base of the recess making it possible for the ball to readily find its seat) thus cutting off the connection between the pipe 38 leading from the generator absorbers to the inlet end of the liquid receiver and condensing coils. Said valve 182 in the operation of the apparatus is, of course, normally open.

In the pipe-fitting 190 below the level of the connecting-pipe 38ʸ is formed an annular flange 190ª, which provides a valve seat 190ᵇ against which seats a ball 191 that is held against its seat by means of a plate 192 bearing against its lower side, and a coiled spring 193 interposed between the bottom of said plate and the upper end of a plug 194 threaded into the lower end of the pipe-fitting 190. Said plug has a vertical aperture into which is threaded the upper end of a pipe 194ˣ which is adapted for discharge into the water in the main tank 20. Said plug 194 is also provided with a transverse aperture through which extends an eye-bolt 190ʸ, the eye of which is located outside of the pipe-fitting 190ᵇ between spaced apertured ears or lugs 190ˣ, and the eye-bolt is adapted to be locked to said lugs by means of a pad-lock 190ᶻ. The upper end of the pipe-fitting 190 is fitted with a threaded plug 195 having a stem 196, which projects through a stuffing box 197 that closes the upper end of the pipe-fitting 190. The stem 196 has a squared head 196ᵃ so that it may be turned by a wrench to bring the reduced lower end 195ᵃ of the plug into engagement with the ball valve 191 so as to depress it away from its seat and thus open communication between the pipe 28 and the discharge pipe 194ˣ. The spring 193 may be made of such tension, say 300 pounds, that in case the pressure in the refrigerating apparatus should become excessive, or beyond that which is intended or necessary in its operation, such pressure will overcome the tension of the spring so as to open the valve 191 whereupon the ammonia will be discharged through the pipe 194ˣ into the water contained in the main chamber 20. The valve 191 thus acts as a safety valve and the key of the pad-lock 190ᶻ may be carried by the city sealer or some one having authority so as to prevent the tension of the spring from being varied or changed.

If, for any reason, it is desired to purge the apparatus, the valve 191 may be opened by means of the stem 196 in which case, if the liquid ammonia in the liquid receiving and condensing coil 37 is intended to be retained therein, the valve 182 may by means of the stem 183 be closed upon its seat before opening the valve 191. At the end of the liquid receiving and condensing coil 37 is secured a reducing nipple 186ᵃ to which is connected a pipe 198 which is adapted to lead the liquid ammonia to the refrigerating or freezing coils in the usual manner. A valve 200 is located in the pipe 198 adjacent the reducing nipple 186ᵃ, said hand-valve being for the purpose of opening communication between the liquid receiving and condensing coil and the pipe leading to said refrigerating coil. Any suitable form of hand-valve may be used but we prefer to use the hand valve shown at the right in Fig. 16.

The operation of the apparatus as an entirety, will be readily understood from the previous description. The generator absorbers alternately act as a generator and an absorber, in the one case being heated and in the other case being cooled, and when the end of the cycle of the one which is acting as a generator is reached, determined by the temperature attained in said generator, the burner is shifted from beneath the generator, the fuel gas supplying the burner being at the same time turned off and the burner being held in an intermediate unbalanced position until the predetermined pressure has been reached, in the absorber. When the burner completes its movement so as to come under the absorber, in which position the fuel gas is again turned on, the drum which has been acting as an absorber begins to act as a generator. At the same time in the last part of the movement of the burner the trough 171 is shifted so as to direct the water into the tank located above the drum which is now to be heated, from which tank said cooling water after doing its work as a rectifier is directed into the pipes which discharge water against the drum which is now absorbing. Should in any case, the drum which is absorbing, reach or pass the predetermined pressure before the drum which is acting as a generator has reached the predetermined temperature, the catches 140 will be withdrawn from the path of the burner rod 135, so that when the burner is shifted it will pass by the catches at once and into the position to heat the drum which has up to that time been acting as an absorber, and at the same time shift the cooling water.

Figures 15, 16, 17, 19:
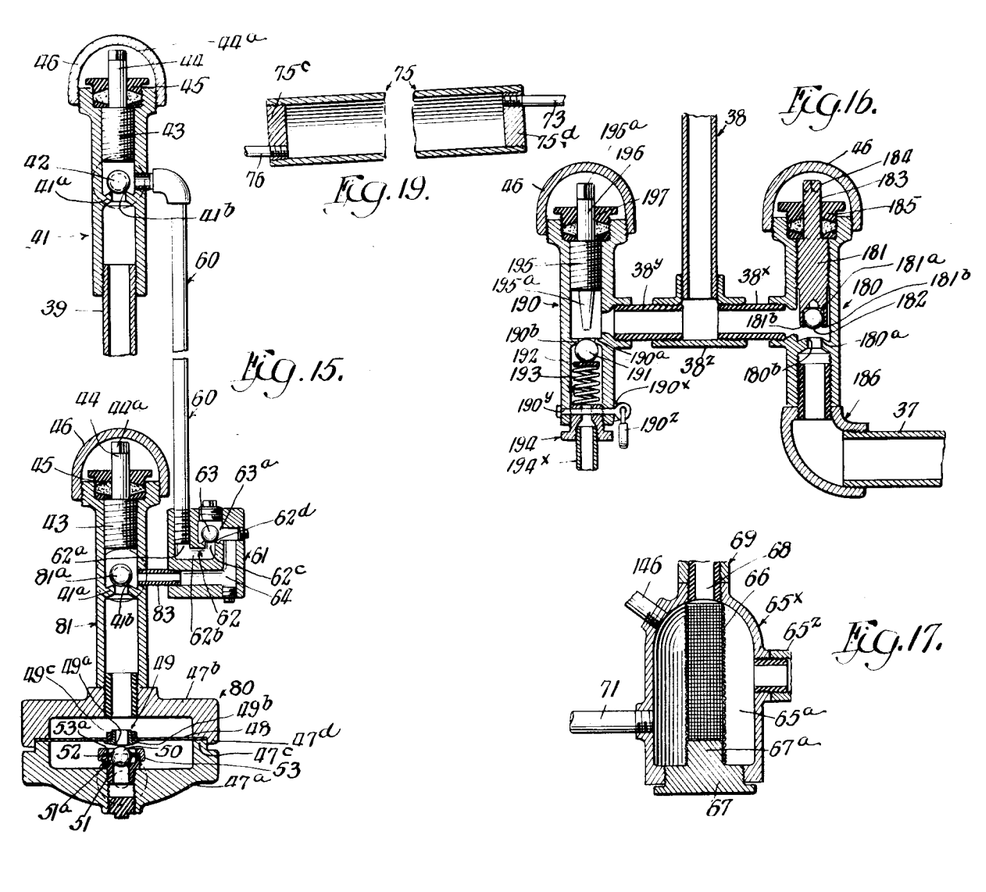
Fig. 15 is a view representing on an enlarged scale a partial vertical section through Fig. 1 in a plane indicated by the line 15—15 of Fig. 1.
Fig. 16 is a view representing on an enlarged scale a partial vertical section through Fig. 3 on the line 16—16 thereof.
Fig. 17 is a view representing a vertical section through the scale trap at the rear end of the machine, to be referred to later.
Fig. 19 is a view representing a longitudinal central section through one of the traps 75.

For charging the apparatus, a pipe 65ᶻ is connected with the scale trap 65ˣ, said pipe being provided with a hand valve, which is preferably similar to that shown in detail on the right of Fig. 16. Said valve is, of course, normally closed being only opened when the apparatus is to be charged.

The tank 20 is provided with an overflow pipe 20ˣ which may be connected with a sewer or any other suitable place for the disposal of the water after it leaves said tank. Said pipe is arranged at a level such that the water in the tank will completely cover the liquid receiver and condensing coils 37.

While in describing our invention, we have referred to certain details of mechanical construction and arrangement, it is to be understood that we are not to be limited thereby except as pointed out in the appended claims.

We claim as our invention:

1. In an automatic refrigerating apparatus of the absorption type, including generator absorbers arranged in pairs, means providing conduits for leading the generated fluid from each of said generator absorbers, and means providing return conduits for leading the expanded fluid back to each of the generator absorbers, means for cooling and heating said generator absorbers in alternation comprising a member adapted to supply heat to either of said generator absorbers, said heat supply member being movable from heating position under one generator absorber to heating position under the other, devices for discharging a cooling fluid against either of said generator absorbers, adapted to be shifted by said heat supply member at a predetermined point in the path of its movement, means for moving said heat supply member from heating position under one generator absorber toward its heating position under the other generator absorber, when the temperature of the generator absorber that is being heated has reached a predetermined point, and stop mechanism for arresting the movement of said heat supply member toward the generator absorber which is being cooled when the pressure therein has not reached or passed a predetermined point.

2. In an automatic refrigeration apparatus of the absorption type, including generator absorbers arranged in pairs, means providing conduits for leading the generated fluid from each of said generator absorbers, and means providing return conduits for leading the expanded fluid back to each of the generator absorbers, means for cooling and heating said generator absorbers in alternation comprising a member adapted to supply heat to either of said generator absorbers, said heat supply member being movable from heating position under one generator absorber to heating position under the other, devices for discharging a cooling fluid against either of said generator absorbers, adapted to be shifted by said heat supply member in the latter part of its movement, means for moving said heat supply member from heating position under one generator absorber toward its heating position under the other generator absorber when the temperature of the generator absorber that is being heated has reached a predetermined point, a controlling device for cutting off the heat supply intermediate the two final positions of said heat supply member, and stop mechanism for arresting the movement of said heat supply member toward the generator absorber which is being cooled when the pressure therein has not reached or passed a predetermined point.

3. In an automatic refrigerating apparatus of the absorption type, including generator absorbers arranged in pairs, means providing conduits for leading the generated fluid from each of said generator absorbers, means providing return conduits for leading the expanded fluid back to each of the generator absorbers, rectifying means interposed in the conduit leading from each generator absorber, means for cooling and heating said generator absorbers in alternation, a thermostatic device affected by the temperature of the fluid in the conduits leading from said generator absorbers, and means controlled by said thermostatic device acting temporarily to turn off or diminish the heat supply when the fluid passing from said rectifier pipes reaches a predetermined temperature below the final temperature intended to be obtained in either of said generators.

4. In a refrigerating apparatus of the absorption type, including generator absorbers arranged in pairs, means providing conduits for leading the generated fluid from each of said generator absorbers, means providing return conduits for leading the expanded fluid back to each of the generator absorbers, a pair of spaced check valves located in the conduit leading from each generator absorber adapted to prevent back-flow therethrough, a suction pipe located in the bottom of each generator absorber, and means providing a free passage from each conduit intermediate the check valves to the associated suction pipe, said means being adapted to prevent a back-flow from said suction pipe to said conduit.

5. In a refrigerating apparatus of the absorption type, including generator absorbers arranged in pairs, means providing conduits for leading the generated fluid from each of said generator absorbers, means providing return conduits for leading the expanded fluid back to each of the generator absorbers, a pair of spaced check valves located in the conduit leading from each generator absorber adapted to prevent back flow therethrough, a by-pass leading from said last-named conduit intermediate said check valves, suction pipes located in the bottoms of said generator absorbers, and means connecting each by-pass with an associated suction pipe.

6. In a refrigerating apparatus of the absorption type, including generator absorbers arranged in pairs, means providing conduits for leading the generated fluid from each of said generator absorbers, means providing return conduits for leading the expanded fluid back to each of the generator absorbers, a pair of spaced check valves located in the conduit leading from each generator absorber adapted to prevent back flow therethrough, a by-pass leading from said last-named conduit intermediate said check valves, suction pipes located in the bottoms of said generator absorbers and connected with the said return conduits, and means connecting each by-pass with an associated suction pipe, said means including a check valve adapted to prevent a return through said by-pass.

7. In a refrigerating apparatus of the absorption type, including generator absorbers arranged in pairs, means providing conduits for discharging the generated fluid from each of said generator absorbers, means providing return conduits for leading the expanded fluid back to each of the generator absorbers, a liquid receiving and condensing coil, a common pipe connected at one end to said liquid receiving and condensing coil and at its other end to each of said discharge conduits, a pair of spaced check valves located in the discharge conduit leading from each generator absorber, through which check valves the generated fluid passes on its way to said common conduit, said check valves being adapted to prevent back flow through said discharge conduits, a by-pass leading from each discharge conduit intermediate said check valves, suction pipes located in the bottoms of the said generator absorbers, and each connected with an associated return conduit, a pair of spaced check valves in each return conduit adjacent the inlet end of the associated suction pipe for preventing a back flow through said return conduits, and means connecting each by-pass with an associated suction pipe, said means including a check valve adapted to prevent a return through said by-pass.

8. In a refrigerating apparatus of the absorption type, including generator absorbers arranged in pairs, means providing discharge conduits for leading the generated fluid from each of said generator absorbers, means providing return conduits for leading the expanded fluid back to each of said generator absorbers, suction pipes in the bottoms of said generator absorbers with which said return conduits are connected, check valves located in said return conduits adapted to prevent a back flow of fluid from the generator absorbers through said return conduits, and means provided in said return conduits for collecting any leakage from said check valves while said generator absorbers are acting as generators and for retaining the same until they begin to act as absorbers.

9. In a refrigerating apparatus of the absorption type, including generator absorbers arranged in pairs, means providing discharge conduits for leading the generated fluids from each of said generator absorbers, means providing return conduits for leading the expanded fluid back to each of said generator absorbers, suction pipes in the bottom of said generator absorbers with which said return conduits are connected, check valves located in said return conduits adapted to prevent a back flow of fluid from the generator absorbers through said return conduits, and means located in said return conduits adjacent said check valves adapted for trapping any liquor which escapes through said check valves.

10. In a refrigerating apparatus of the absorption type, including generator absorbers arranged in pairs, means providing discharge conduits for leading the generated fluid from each of said generator absorbers, means providing return conduits for leading the expanded fluid back to each of said generator absorbers, suction pipes in the bottom of said generator absorbers with which said return conduits are connected, check valves located in said return conduits adapted to prevent a back flow of fluid from the generator absorbers through said return conduits, and a trap located in each return conduit comprising a pipe of large diameter provided with closed ends, said conduit entering the closed end of said trap nearer the associated suction pipe at a low level and entering its opposite closed end at a high level.

11. In a refrigerating apparatus of the absorption type, including generator absorbers arranged in pairs, means providing discharge conduits for leading the generated fluid from each of said generator absorbers, means providing return conduits for leading the expanded fluid back to each of said generator absorbers, suction pipes in the bottom of said generator absorbers with which said return conduits are connected, check valves located in said return conduits adapted to prevent a back flow of fluid from the generator absorbers through said return conduits, and a trap located in each return conduit consisting of a pipe having closed ends and being inclined upwardly in a direction leading away from its associated generator absorber, said conduit entering the closed end of said trap nearer the associated suction pipe at a low level and entering its opposite end at a high level.

In testimony that we claim the foregoing as our invention we affix our signatures in the presence of two witnesses, this 24th day of January A. D. 1912.

FRED W. WOLF, Jr.
HARRISON H. SOUTHWORTH.

Witnesses:
H. A. HAUXHURST,
W. C. SAEGER.